(12) United States Patent
Nakamura

(10) Patent No.: US 8,479,205 B2
(45) Date of Patent: Jul. 2, 2013

(54) SCHEDULE CONTROL PROGRAM AND SCHEDULE CONTROL METHOD

(75) Inventor: Kazuhiro Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1312 days.

(21) Appl. No.: 12/006,028

(22) Filed: Dec. 28, 2007

(65) Prior Publication Data
US 2008/0109817 A1 May 8, 2008

Related U.S. Application Data

(63) Continuation of application No. PCT/JP2005/014590, filed on Aug. 9, 2005.

(51) Int. Cl.
*G06F 9/46* (2006.01)

(52) U.S. Cl.
USPC ............ 718/102; 718/103; 718/104; 711/169

(58) Field of Classification Search
None
See application file for complete search history.

(56) References Cited

U.S. PATENT DOCUMENTS

| | | | |
|---|---|---|---|
| 5,185,861 A * | 2/1993 | Valencia | 711/120 |
| 5,287,508 A | 2/1994 | Hejna, Jr. et al. | |
| 5,784,614 A | 7/1998 | Davis | |
| 5,872,972 A | 2/1999 | Boland et al. | |
| 5,875,469 A * | 2/1999 | Milling | 711/146 |
| 5,974,438 A | 10/1999 | Neufeld | |
| 6,665,699 B1 | 12/2003 | Hunter et al. | |
| 6,948,170 B2 * | 9/2005 | Izumi | 718/100 |

FOREIGN PATENT DOCUMENTS

| | | |
|---|---|---|
| GB | 2 258 933 | 2/1993 |
| JP | 3-44742 | 2/1991 |
| JP | A 3-44742 | 2/1991 |
| JP | A 4-283849 | 10/1992 |
| JP | A 5-151064 | 6/1993 |
| JP | A 8-30562 | 2/1996 |
| JP | 10-105461 | 4/1998 |
| JP | A 10-143382 | 5/1998 |
| JP | 11-259318 | 9/1999 |
| JP | A 11-259318 | 9/1999 |

OTHER PUBLICATIONS

Stanley L. Zimmerman, et al., "Two-Level Cache Performance for Multiprocessors," Simulation, vol. 60, No. 4, pp. 222-231, 1993.
Office Action issued by the Japanese Patent Office for Application 2007-529429, dated Aug. 31, 2010 (with partial English language translation).

* cited by examiner

*Primary Examiner* — Emerson Puente
*Assistant Examiner* — Sisley Kim
(74) *Attorney, Agent, or Firm* — Greer, Burns & Crain, Ltd.

(57) ABSTRACT

A schedule control program that is capable of allocating threads to CPUs so as to effectively use caches. When a thread is executed, the execution start time and the CPU number of a CPU that executes the thread are stored. When an interrupted thread is re-allocated to a CPU to execute it next, an elapsed time t counted from the execution start time is calculated. Time parameters are set to caches that are used by the CPUs in such a way that the higher the level of a cache, the larger time parameter is set. If the elapsed time t is smaller than a time parameter set to an n-level (where n is a natural number of 2 or greater) cache and is equal to or larger than a time parameter set to an (n-1)-level cache, the thread is allocated to a CPU with the lowest load among the CPUs sharing the n-level cache with the last execution CPU.

4 Claims, 7 Drawing Sheets

SCHEDULE CONTROL PROGRAM AND SCHEDULE CONTROL METHOD

This application is a continuing application, filed under 35 U.S.C. §111(a), of International Application PCT/JP2005/014590, filed Aug. 9, 2005.

BACKGROUND OF THE INVENTION (1) Field of the Invention

This invention relates to a schedule control program and a schedule control method, and more particularly to a schedule control program that causes a computer to allocate threads to a plurality of processor devices to execute them, and a schedule control method for allocating threads to a plurality of processor devices to execute them.

(2) Description of the Related Art

In an OS (Operating System) compatible with a multiprocessor system that executes a program with a plurality of CPUs (Central Processing Unit), the program to be executed is divided into a plurality of execution units (hereinafter, referred to as threads) and the threads are allocated to the CPUs by a scheduler of the OS, to thereby execute the program. Parallel execution of one program using a plurality of CPUs saves the execution time of the program and balances loads on the CPUs.

The scheduler selects, for each CPU, a thread with the highest priority in a queue (hereinafter, referred to as a run queue) where a series of threads are waiting to be executed, and causes the CPU corresponding to the run queue of the selected thread to execute the thread. In this connection, an execution start time is recorded for each thread.

FIG. 7 is a view schematically showing how a conventional scheduler allocates a thread. FIG. 7(A) shows data remaining in cache memories when a certain thread is executed. FIG. 7(B) is a view showing data remaining in the cache memories when the thread is re-allocated after a predetermined period of time.

Here, a partial configuration of a computer is illustrated, in which primary cache memories (hereinafter, referred to as primary caches) 501a, 501b, 501c, and 501d are connected to CPUs 500a, 500b, 500c, and 500d, respectively. The CPUs 500a and 500b share a secondary cache memory (hereinafter, referred to as a secondary cache) 502a, and the CPUs 500c and 500d share a secondary cache 502b. In this connection, the shadow areas represent data.

Referring to FIG. 7(A), the CPU 500a executes a thread 510. At this time, data to be used for the thread 510 is read from, for example, an unillustrated main memory, and is stored in the primary cache 501a and the secondary cache 502a. It should be noted that threads 511, 512, and 513 are successively connected to each other in a run queue and are waiting to be executed.

By the way, unlike a single-processor system, a multiprocessor system does not always execute a thread with a same CPU but interrupts the CPU executing the thread after a predetermined period of time and causes the CPU to execute another thread, thereby realizing multi-tasks. When the execution of an interrupted thread 510, for example, is resumed, the scheduler selects a CPU to put the thread 510 into its run queue as follows, as shown in FIG. 7(B).

(1) If a time that elapsed from a time (execution start time) when the thread 510 last obtained an execution right to a time when the thread 510 is put into a run queue this time is within a prescribed period of time, the CPU 500a that last executed the thread 510 is selected.

(2) If the elapsed time exceeds the prescribed period of time, a CPU with the lowest load is selected from among all the CPUs 500a to 500d.

This is because, if the elapsed time is within the prescribed period of time, it can be expected that data used for the last execution of the thread 510 remains in a cache used by the CPU 500a that last executed the thread 510. This control improves a cache hit rate and also improves performance. Load on each CPU is determined according to the number of threads 514, 515, and 516 waiting in its run queue and their priorities.

Further, as a technique of decreasing the number of cache misses in a multiprocessor system, such a technique is known that the number of blocks kept by each thread (task) in the cache of each processor device is counted, the counting result is stored in a memory shared by a plurality of processor devices, and when the execution of the thread is resumed, a processor device having a greater number of blocks in the cache is selected based on the counting result and is caused to execute the thread (for example, refer to Japanese Unexamined Patent Application Publication No. 8-30562 (paragraphs [0020] to [0039], and FIGS. 1 to 5)).

In addition, as a technique of decreasing the number of cache misses in a secondary cache, there is a known technique of always causing a specified CPU group to execute a process in a multiprocessor system comprising a plurality of CPU groups of CPUs, each of the CPU groups sharing a secondary cache, the plurality of CPU groups connected to each other (for example, refer to Japanese Unexamined Patent Application Publication No. 10-143382).

However, a conventional schedule control method of allocating an interrupted thread to a CPU based on a predetermined elapsed time counted from the last execution start time has the following drawback.

As shown in FIG. 7(B), there is such a case that the primary cache 501a does not have data which was stored at the last execution of the thread 510 but the secondary cache 502a still has the data, depending on an elapsed time. There is also such a case that the secondary cache 502a does not have the data but an unillustrated tertiary cache has the data. That is, a higher-level cache has a higher possibility of having data even after a long elapsed time. However, in the conventional schedule control, a CPU with the lowest load is selected from among all CPUs if an elapsed time exceeds a predetermined period of time, without taking such possibility into consideration. Therefore, data remaining in a cache may be wasted and the caches are not effectively used.

SUMMARY OF THE INVENTION

This invention has been made in view of the foregoing and intends to provide a schedule control program for allocating threads to CPUs so as to effectively use caches.

Further, the invention also intends to provide a schedule control method for allocating threads to CPUs so as to effectively use caches.

To achieve the above object, there provided a computer-readable recording medium storing a schedule control program causing a computer to perform a process of allocating threads to a plurality of processor devices to execute the threads. This program causing a computer to perform as: thread information memory means for storing therein an execution start time and identification information of a processor device that executes a thread when the thread is executed; elapsed time calculator means for calculating an elapsed time counted from the execution start time when the thread interrupted is re-allocated to a next processor device to execute the thread next; and thread allocator means for setting time parameters to cache memories used by the plurality of processor devices in such a way that the higher a level of a cache memory, the larger time parameter is set, and if the elapsed time is smaller than a time parameter set to a n-level (n is a natural number of 2 or greater) cache memory and is equal to or larger than a time parameter set to a (n−1)-level cache memory, allocating the thread interrupted to the next processor device with a lowest load among the processor device that last executed the thread and processor devices sharing the n-level cache memory with the processor device that last executed the thread.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7(A) is a view showing data remaining in cache memories when a certain thread is executed.

DESCRIPTION OF THE PREFERRED EMBODIMENTS

Hereinafter, a preferred embodiment of the present invention will be described in detail with reference to the accompanying drawings.

First, an outline of the embodiment of this invention will be described.

Figure 1:
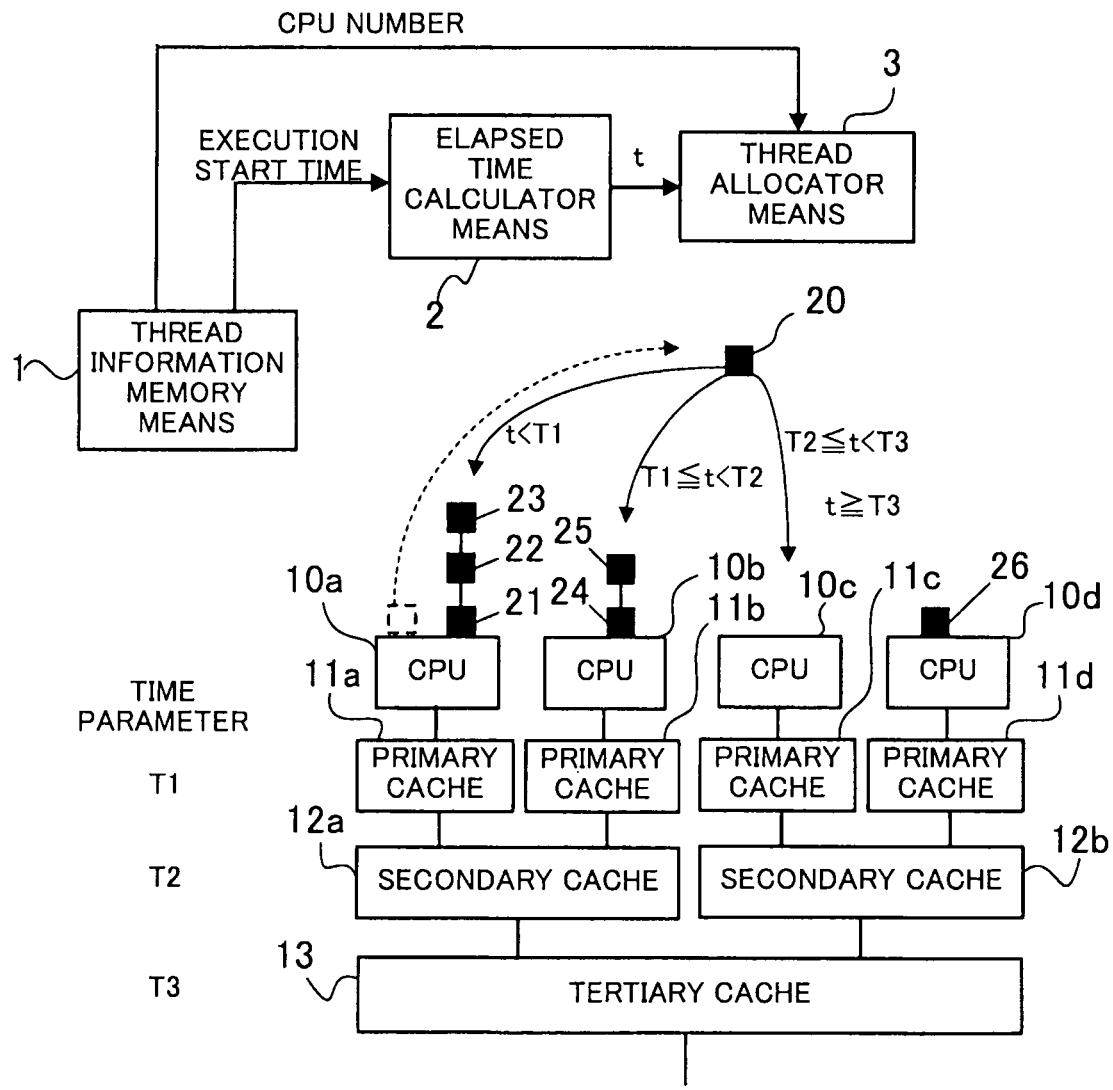
FIG. 1 is a view for explaining an outline of schedule control of allocating threads to a plurality of CPUs to execute them.

FIG. 1 is a view for explaining an outline of schedule control of allocating threads to a plurality of CPUs to execute them.

This embodiment is described, by way of example, by applying the schedule control to a computer in which a plurality of CPUs 10a, 10b, 10c, and 10d are connected to primary caches 11a, 11b, 11c, and 11d, respectively, the CPUs 10a and 10b share a secondary cache 12a, the CPUs 10c and 10d share a secondary cache 12b, and the CPUs 10a to 10d share a tertiary cache 13. In addition, threads 20, 21, 22, 23, 24, 25, and 26 to be executed by the CPUs 10a to 10d are schematically illustrated.

The schedule control of allocating threads to the plurality of CPUs 10a to 10d to execute them is realized by a thread information memory means 1, an elapsed time calculator means 2, and a thread allocator means 3.

Now, the functions of each processing means will be described.

When a thread 20 to 26 is executed, the thread information memory means 1 stores therein an execution start time and the identification information (hereinafter, CPU number) of an execution CPU 10a to 10d that executes the thread.

The elapsed time calculator means 2 calculates an elapsed time t counted from an execution start time stored in the thread information memory means 1, when an interrupted thread (for example, thread 20) is re-allocated to a next execution CPU 10a to 10d to execute it next.

The thread allocator means 3 allocates the threads 20 to 26 to the CPUs 10a to 10d. In this connection, time parameters T1, T2, and T3 (T1<T2<T3) are set to the cache memories (primary caches 11a, 11b, 11c, and 11d, secondary caches 12a and 12b, tertiary cache 13) used by the CPUs 10a to 10d in such a way that the higher the level of a cache memory, the larger time parameter is set. The time parameter is set as an indication of a period of time during which data used for the last execution of an interrupted thread remains in a cache. Since a higher-level cache has a larger capacity, the higher-level cache has a higher possibility of having data even after a long elapsed time t. Therefore, a larger time parameter is set as the level of a cache memory is higher. In more detail, the time parameter is determined according to the capacity of a cache, a benchmark, etc. When an elapsed time t of an interrupted thread is smaller than a time parameter set to a n-level (n is a natural number of 2 or larger) cache and is equal to or larger than a time parameter set to a (n−1)-level cache, the thread allocator means 3 allocates the interrupted thread to a CPU with the lowest load among the last execution CPU that last executed the thread and the CPUs sharing the n-level cache with the last execution CPU.

Now, the outline of a schedule control method according to the embodiment will be described by using an example of re-allocating an interrupted thread 20 to one of the CPUs 10a to 10d.

To allocate the interrupted thread 20 to one of the CPUs 10a to 10d, the elapsed time calculator means 2 calculates an elapsed time t up to the current time from the last execution start time of the thread 20 which is stored in the thread information memory means 1. The thread allocator means 3 allocates the thread 20 according to the calculated elapsed time t as follows.

First, in the case of the elapsed time t<T1, the thread allocator means 3 selects the CPU 10a that last executed the thread 20, based on the CPU number stored in the thread information memory means 1, and re-allocates the thread 20 to the CPU 10a (by putting it in the run queue of the CPU 10a).

In the case of T1≦t<T2, the thread allocator means 3 allocates the threads 20 to a CPU with a lower load between the last execution CPU 10a and the CPU 10b sharing the secondary cache 12a with the CPU 10a. Referring to FIG. 1, there are three threads 21, 22, and 23 in the run queue of the CPU 10a while there are two threads 24 and 25 in the run queue of the CPU 10b. Therefore, the thread allocator means 3 puts the thread 20 in the run queue of the CPU 10b with a lower load.

In the case of T2≦t<T3, the thread allocator means 3 allocates the thread 20 to a CPU with the lowest load among the last execution CPU 10a and the CPUs 10b, 10c, and 10d sharing the tertiary cache 13 with the CPU 10a. Referring to FIG. 1, there is no thread in the CPU 10c while there is one thread 26 in the CPU 10d. Therefore, the thread 20 is allocated to the CPU 10c.

In the case of t≧T3, the thread 20 is allocated to a CPU with the lowest load among all the CPUs 10a, 10b, 10c, and 10d, as in the conventional method. Referring to FIG. 1, the CPU 10c is selected and the thread 20 is allocated thereto.

As described above, a CPU 10a to 10d that uses a cache that has a high possibility of having data stored at the last execution is selected according to an elapsed time for allocating the interrupted thread 20 thereto. This can increase a cache hit rate and provide effective use of caches.

In addition, a process of allocating a thread to a CPU with the lowest load among CPUs 10a to 10d sharing a cache is performed. This means that a load balancing process can also be done by allocating the thread 20. This prevents deterioration in the cache hit rate, which is caused because data of a thread stored in a cache is removed due to the load balancing process performed after the thread allocation.

Now, the embodiment will be described in detail.

Figure 2:
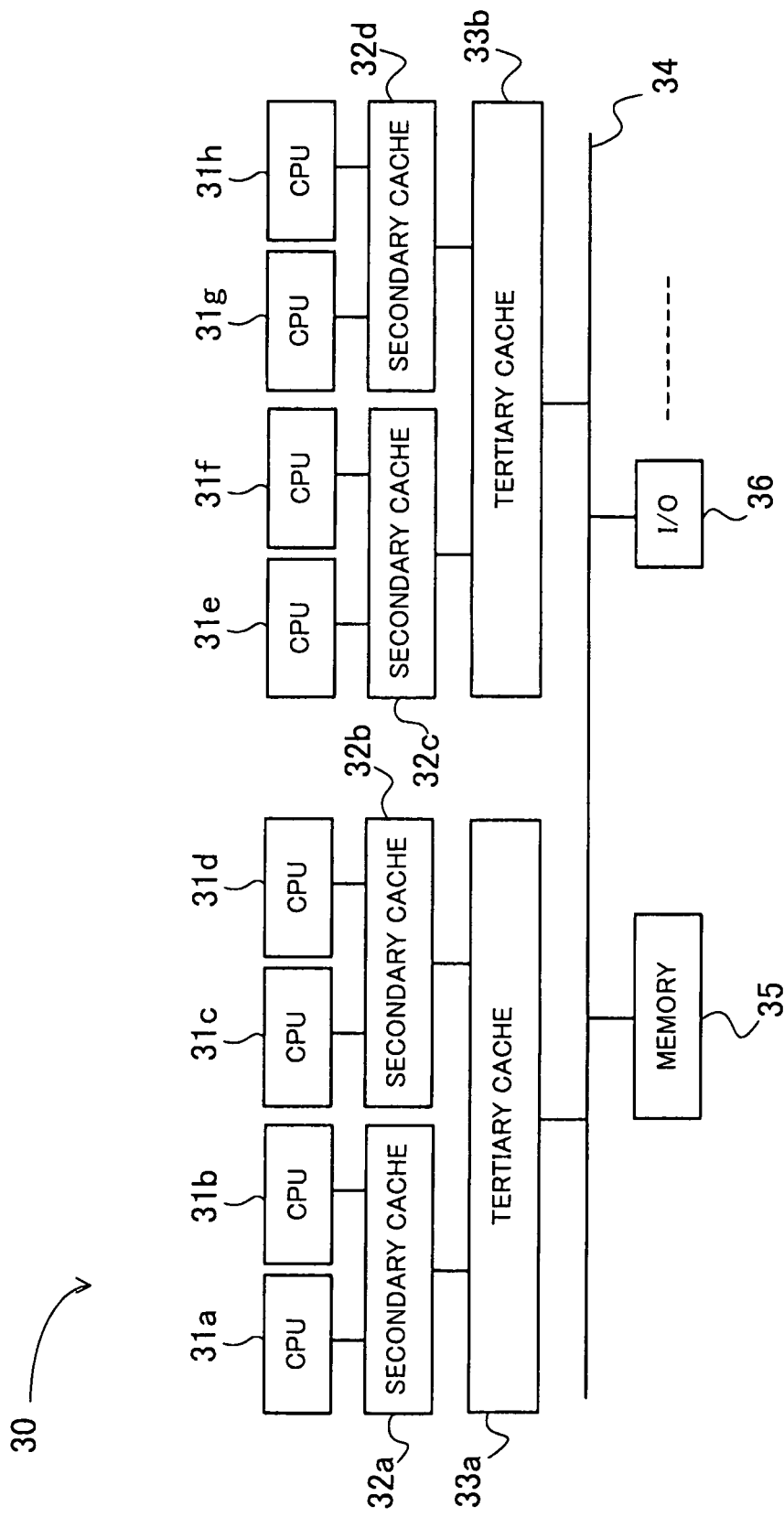
FIG. 2 is an example hardware configuration diagram of a computer that executes the schedule control according to this embodiment.

FIG. 2 shows an example hardware configuration diagram of a computer that executes the schedule control according to the embodiment.

The illustrated computer 30 is a UNIX (registered trademark) server computer, for example.

The computer 30 comprises eight CPUs 31a, 31b, 31c, 31d, 31e, 31f, 31g, and 31h each having a primary cache incorporated therein, secondary caches 32a, 32b, 32c, and 32d, tertiary caches 33a and 33b, a memory 35 connected to the tertiary caches 33a and 33b via a system bus 34, an I/O 36, etc.

The secondary cache 32a is shared by the CPUs 31a and 31b, the secondary cache 32b is shared by the CPUs 31c and 31d, the secondary cache 32c is shared by the CPU 31e and 31f, the secondary cache 32d is shared by the CPUs 31g and 31h. Further, the tertiary cache 33a is shared by the CPUs 31a, 31b, 31c, and 31d, and the tertiary cache 33b is shared by the CPU 31e, 31f, 31g, and 31h.

Such hardware configuration information is described in firmware as follows.

Figure 3:
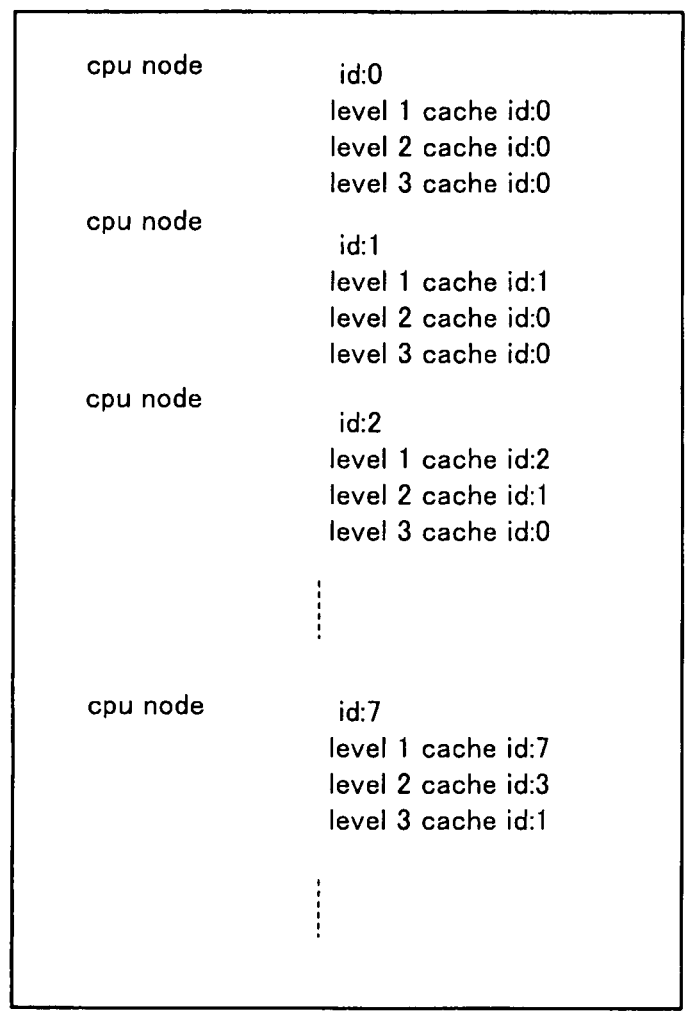
FIG. 3 is a view showing hardware configuration information.

FIG. 3 is a view showing hardware configuration information.

For example, a CPU (cpu node) is described with its identification information "id: ~". In addition, the identification information of caches that the CPU uses is described on a cache level basis. For example, regarding the CPU 31a of FIG. 2, the identification information is described as "id=0", the primary cache incorporated in the CPU 31a is described as "level 1 cache id:0", the secondary cache 32a that the CPU 31a uses is described as "level 2 cache id:0", and the tertiary cache 33a is described as "level 3 cache id:0". Further, regarding the CPU 31h, for example, its identification information is described as "id=7", the identification information of the primary cache incorporated in the CPU 31h is described as "level 1 cache id:7", the identification information of the secondary cache 32d that the CPU 31h uses is described as "level 2 cache id:3", and the identification information of the tertiary cache 33b is described as "level 3 cache id:1". In addition, the hardware configuration information includes descriptions indicating the configuration such as the memory 35 and the I/O 36, which are not illustrated. Such hardware configuration information is given to the OS.

Figure 4:
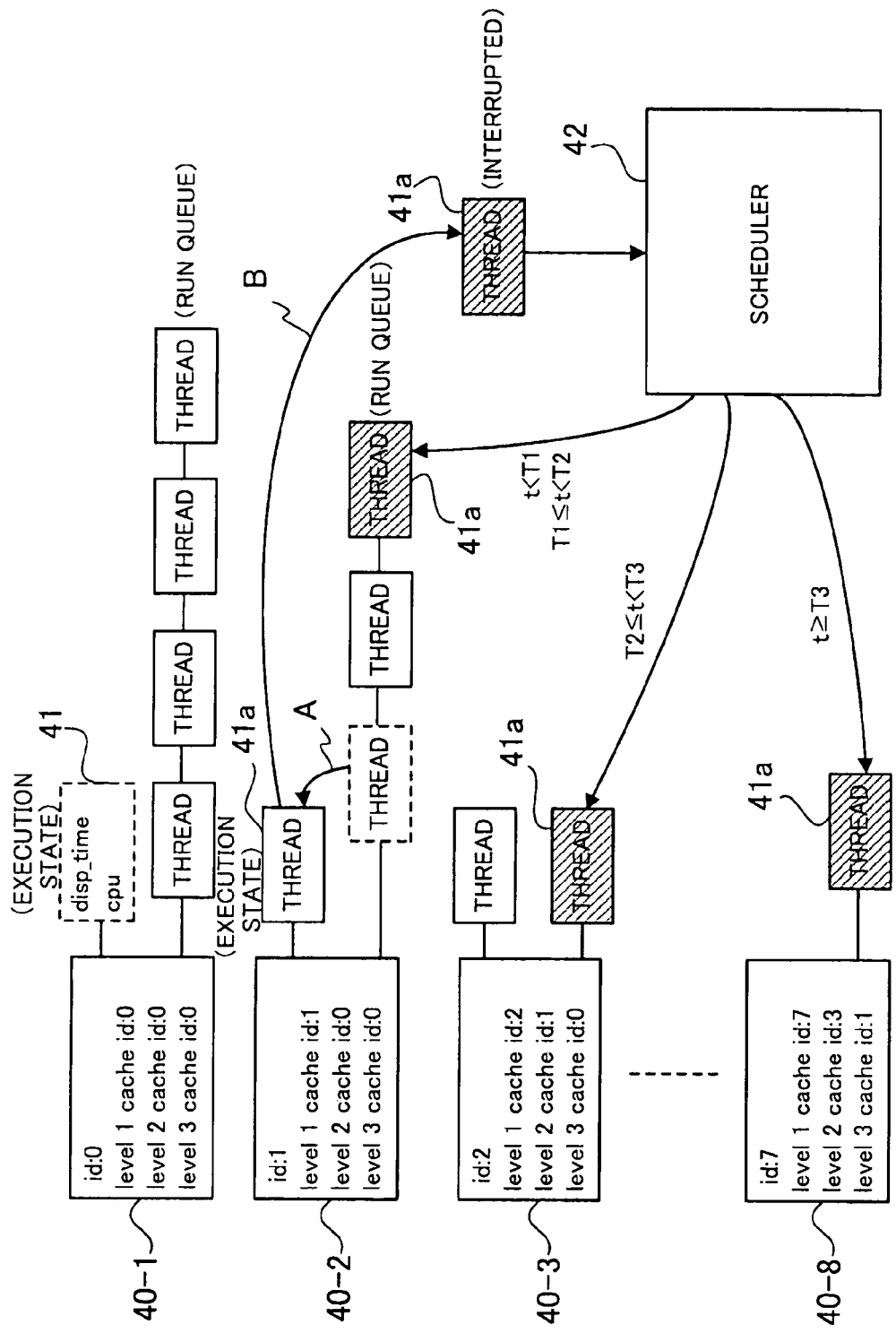
FIG. 4 is a view schematically showing the functions of an OS relating to the schedule control according to the embodiment.

FIG. 4 is a view schematically showing the functions of an OS relating to the schedule control according to the embodiment.

Based on the hardware configuration information from the firmware, CPU management structures 40-1, 40-2, 40-3, . . . , 40-8 indicating the information on the CPUs 31a to 31h of FIG. 2 are created. The thread 41 is represented by a thread management structure, in which an execution start time "disp_time" of the thread 41 and the CPU number "cpu" that executed the thread 41 are stored. The thread 41 is allocated to one of the CPU 31a to 31h by the scheduler 42.

The scheduler 42 of the OS refers to the thread management structures to select a CPU for allocating an interrupted thread thereto, according to an elapsed time. In addition, the scheduler 42 sets time parameters T1, T2, and T3 according to the levels of caches as described before.

The OS having such functions allows the means shown in FIG. 1 to be realized on the hardware computer 30 shown in FIG. 2.

Now, the schedule control method of the embodiment will be described with reference to FIGS. 2, 3, and 4.

First, a process for executing a thread will be described.

Figure 5:
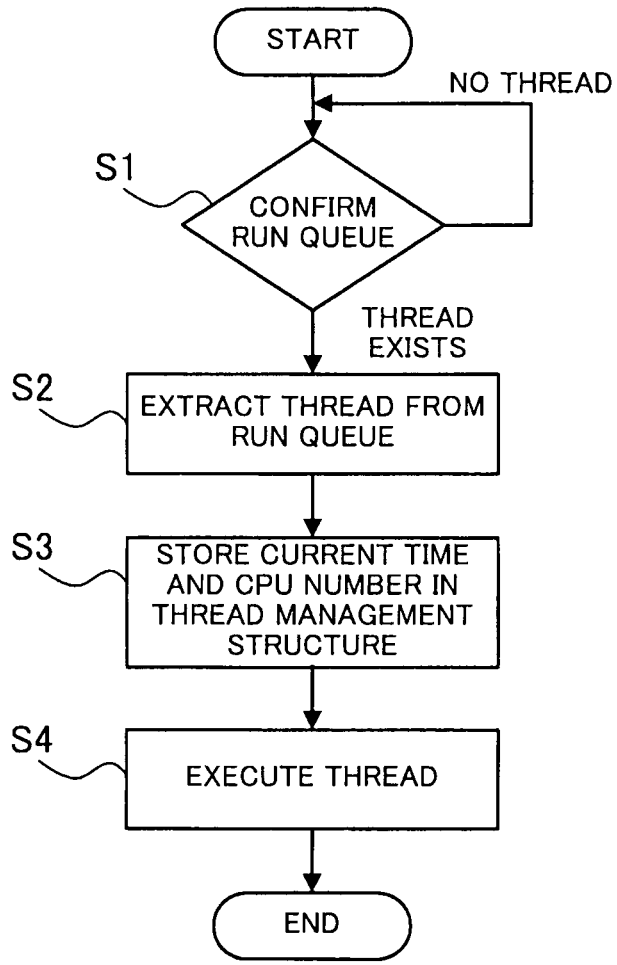
FIG. 5 is a flowchart for explaining how to execute a thread.

FIG. 5 is a flowchart for explaining how to execute a thread.

When a thread execution process is started, the scheduler 42 confirms the run queue of each CPU 31a to 31h to detect the existence of a waiting thread 41. If there is a thread 41, the procedure goes on to step S2. If there is no thread 41, on the contrary, the step S1 is repeated until a thread 41 appears in a run queue (step S1).

When the thread 41 exists in a run queue, the scheduler 42 extracts the thread 41 from the run queue and makes it in an execution state. Now, the thread 41a waiting in the run queue of the CPU 31b represented by the CPU management structure 40-2 as shown in FIG. 4 will be described by way of example. As shown by an arrow A in FIG. 4, the thread 41a is extracted from the run queue of the CPU 31b represented by the CPU management structure 40-2, and the thread 41a is given an execution right to be executed by the CPU 31b (step S2).

Further, in the thread management structure of the thread 41a having the execution right, the current time as an execution start time "disp_time" and the CPU number (for example, "id=1" that is the identification information of the CPU 31b) of the CPU 31b that is to execute the thread are stored (step S3).

Then, the CPU 31b executes the thread 41a having the execution right (step S4).

Such a thread 41a is deleted after being processed. However, the execution of the thread 41a may be interrupted before the process is completed if a response should be received from an external device via the I/O 36, if another thread is using an exclusive resource, or if the process of the thread 41a takes time longer than a prescribed time (arrow B of FIG. 4). In such cases, the scheduler 42 makes the thread 41a in an interrupted state, and gives another thread waiting in the run queue of the CPU 31b, an execution right. When the execution of the thread 41a is resumed when the response is made from the external device via the I/O 36, when the exclusive resource that the other thread has used is released, or after an execution right is to be given to another thread because the process of the other thread 41a takes time longer than the prescribed time, a process of re-allocating the thread 41a to any one of the CPUs 31a to 31h is performed.

Figure 6:
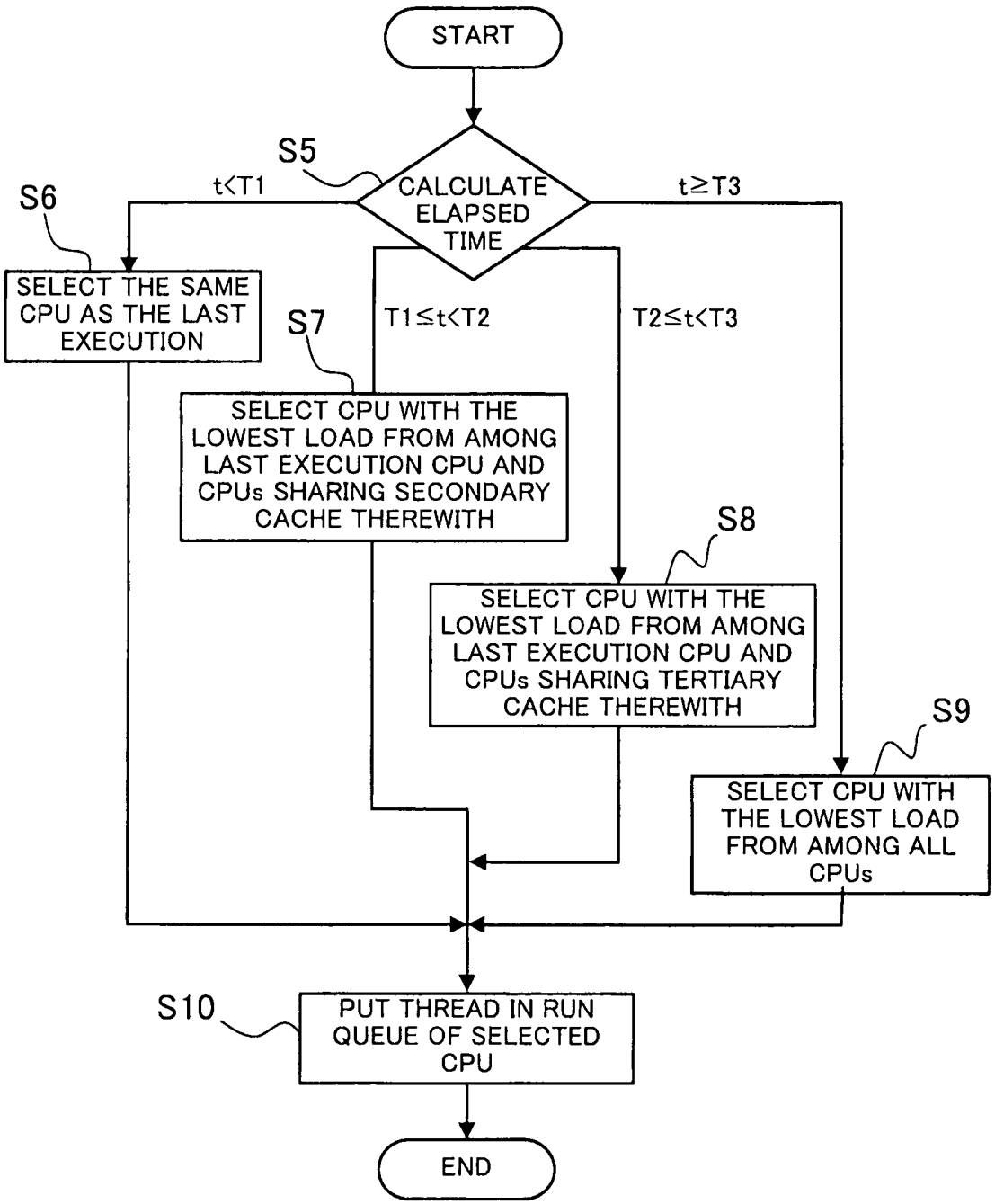
FIG. 6 is a view for explaining how to put an interrupted thread into the run queue of a CPU.
Figure 7A:
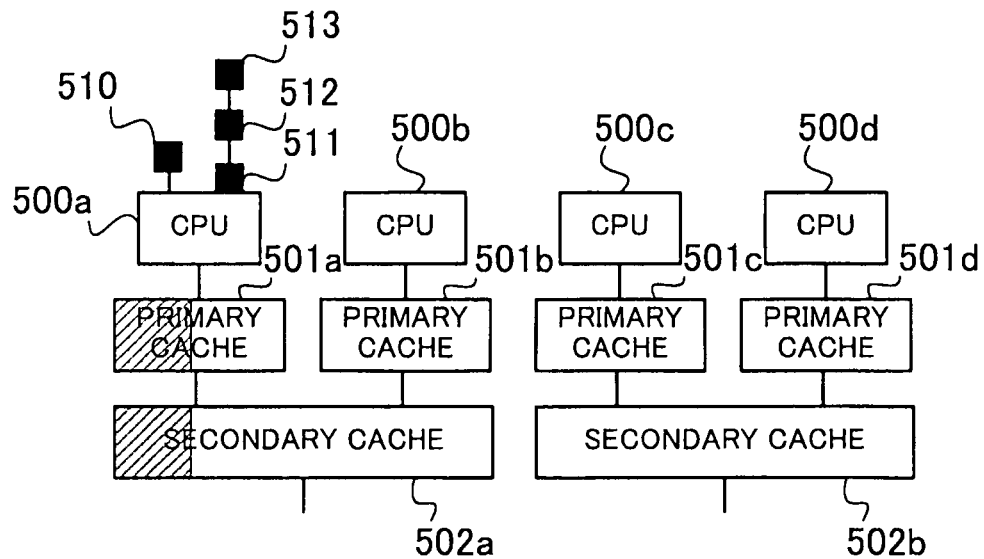
FIGS. 7(A) and (B) are views schematically showing how a conventional scheduler allocates a thread.
Figure 7B:
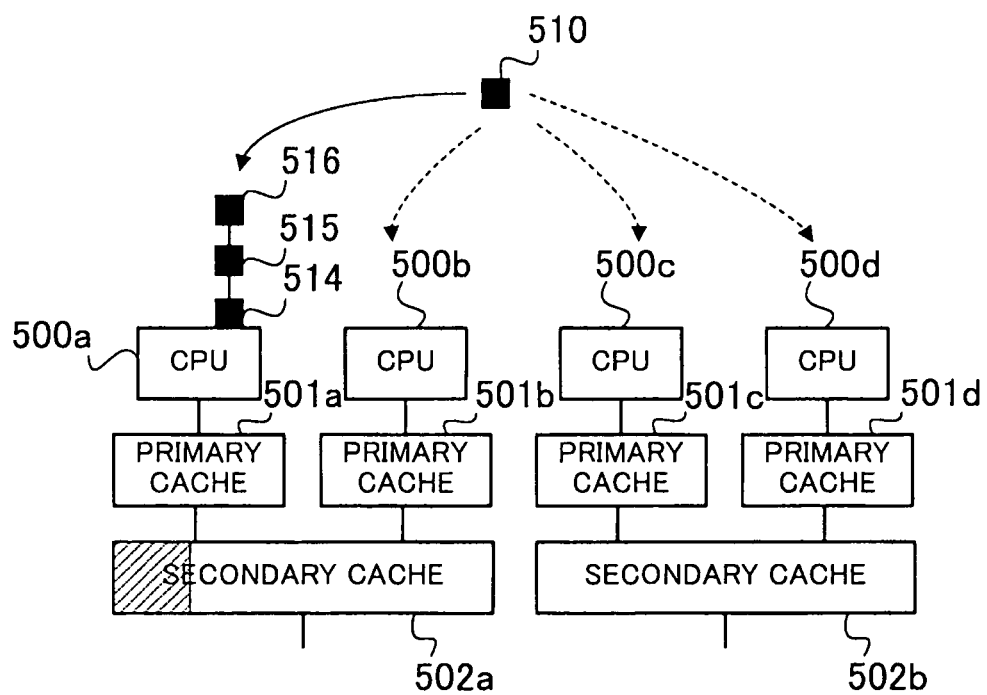
FIG. 7(B) is a view showing data remaining in the cache memories when the thread is re-allocated after a predetermined period of time.

FIG. 6 is a view for explaining how to put an interrupted thread in the run queue of one CPU.

The following description uses the thread 41a shown in FIG. 4 as well.

First, the scheduler 42 calculates as an elapsed time t a period of time between the execution start time "disp_time", which is stored in the thread management structure of the interrupted thread 41a, and the current time (step S5).

Then in the case of the elapsed time t<T1, the same CPU 31b as the last execution is selected (step S6).

In the case of T1≦t<T2, a CPU with the lowest load is selected from among the CPUs 31a and 31b sharing the secondary cache 32a with the last execution CPU 31b. In the example of FIG. 4, the number of threads 41 waiting in the run queue of the CPU 31a represented by the CPU management structure 40-1 is greater than the number of threads 41 waiting in the run queue of the CPU 31b represented by the CPU management structure 40-2. This means that the CPU 31a has a larger load, and therefore the CPU 31b is selected (step S7).

In the case of T2≦t<T3, a CPU with the lowest load is selected from among the CPUs 31a, 31b, 31c, and 31d sharing the tertiary cache 33a with the last execution CPU 31b. In the example of FIG. 4, the CPU 31c represented by the CPU management structure 40-3 is selected (step S8).

In the case of t≧T3, a CPU with the lowest load is selected from among all the CPUs 31a to 31h. In the example of FIG. 4, the CPU 31h represented by the CPU management structure 40-8 is selected (step S9).

Then, finally the scheduler 42 puts the thread 41a in the run queue of the selected CPU (step S10).

As described above, according to the schedule control method of this embodiment, a CPU that uses a cache that has a high possibility of having data stored at the last execution is selected according to an elapsed time for allocating an interrupted thread thereto. This can increase the cache hit rate and provide effective use of caches.

In addition, a process of allocating a thread to a CPU with the lowest load among CPUs sharing a cache is performed, which means that a load balancing process can also be done by allocating an interrupted thread. This can prevent deterioration in the cache hit rate, which is caused because data of a thread stored in a cache is removed due to a load balancing process performed after the thread allocation.

The processing functions described above can be realized by a computer. In this case, a program is prepared, which describes processes for the functions to be performed by the computer. The program is executed by a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes, etc. The optical discs include DVDs (Digital Versatile Discs), DVD-RAM, CD-ROM, CD-R (Recordable)/RW (ReWritable), etc. The magneto-optical recording media include MO (Magneto-Optical disk) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

Hereinbefore, the embodiment of the present invention has been described. However, this invention is not limited to the above description and various modifications can be made within the scope of the invention described in the claims. For example, a computer having caches up to tertiary caches is described by way of example, and a computer having tertiary or higher-level caches can be applied as well.

According to the present invention, an execution start time and the identification information of an execution processor device are stored when a thread is executed. When an interrupted thread is re-allocated to a next execution processor device, an elapsed time counted from the execution start time is calculated. Time parameters are set to caches that are used by the processor devices in such a way that the higher the level of a cache, the larger time parameter is set. If the elapsed time is smaller than a time parameter set to a n-level (n is a natural number of 2 or greater) cache and is equal to or larger than a time parameter set to a (n−1)-level cache, the interrupted thread is allocated to a processor device with the lowest load among the last execution processor device that last executed the thread and the processor devices sharing the n-level cache with the last execution processor device. This means that a processor device that uses a cache that have a high possibility of having data stored at the last execution is selected for allocating the interrupted thread thereto, depending on the elapsed time. This can increase a cache hit rate and effectively use the caches.

Further, a process of allocation to a processor device with the lowest load among processor devices sharing a cache is performed, which means that a load balancing process can also be done by allocating an interrupted thread. Thus, deterioration in a cache hit rate can be prevented, which is caused by removing data of threads from caches due to a load balancing process performed after the thread allocation.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable, non-transitory medium storing a schedule control program for allocating threads to a plurality of groups of processor devices to execute the threads, the schedule control program causing a computer to perform a procedure comprising:

storing an execution start time and identification information of a processor device when the processor device starts to execute a thread;

calculating an elapsed time counted from the execution start time when the thread is re-allocated after being interrupted;

setting a plurality of time parameters to first to n-th level cache memories in such a way that the higher a level of a cache memory, the larger time parameter is set, wherein n is a natural number equal to or greater than 3, and each of the groups of processor devices share $2^{nd}$ level cache memory and different groups of processor devices share n-th level cache memories whose levels are equal to or greater than 3, and the plurality of the groups of processor devices are connected to each other;

determining an m-th level cache memory, which is among the first to n-th level cache memories, whose level is lowest of the first to n-th level cache memories expected to contain data used in the interrupted thread and shared by the different groups of processor devices, by comparing the elapsed time with the plurality of time parameters, successively from the time parameter of the first level cache memory to the time parameter of the n-th level cache memories, until the elapsed time is found to be smaller than the time parameter of the n-th level cache memories; and allocating the interrupted thread to a processor device with a lowest load which is selected from among the processor device that last executed the thread and other processor devices sharing the m-th level cache memory with the processor device that last executed the thread.

2. The computer-readable, non-transitory medium according to claim 1, wherein the time parameters are set according to capacities of the first to n-th level cache memories.

3. A schedule control method for allocating threads to a plurality of groups of processor devices to execute the threads, the schedule control method comprising:

storing an execution start time and identification information of a processor device when the processor device starts to execute a thread;

calculating an elapsed time counted from the execution start time when the thread is re-allocated after being interrupted;

setting a plurality of time parameters to first to n-th level cache memories in such a way that the higher a level of a cache memory, the larger time parameter is set, wherein n is a natural number equal to or greater than 3, and each of the groups of processor devices share $2^{nd}$ level cache memory and different groups of processor devices share n-th level cache memories whose levels are equal to or greater than 3, and the plurality of the groups of processor devices are connected to each other;

determining an m-th level cache memory, which is among the first to n-th level cache memories, whose level is lowest of the first to n-th level cache memories expected to contain data used in the interrupted thread and shared by the different groups of processor devices, by comparing the elapsed time with the plurality of time parameters, successively from the time parameter of the first level cache memory to the time parameter of the n-th level cache memories, until the elapsed time is found to be smaller than the time parameter of the n-th level cache memories; and allocating the interrupted thread to a processor device with a lowest load which is selected from among the processor device that last executed the thread and other processor devices sharing the m-th level cache memory with the processor device that last executed the thread.

4. The schedule control method according to claim 3, wherein the time parameters are set according to capacities of the first to n-th level cache memories.

* * * * *